United States Patent [19]

Tsagas

[11] 3,930,223

[45] Dec. 30, 1975

[54] APPARATUS FOR INDICATING PNEUMATIC TIRE PRESSURE

[75] Inventor: Nicolas Fotios Tsagas, Liverpool, England

[73] Assignee: Alexis Kalogeropoulos, England; a part interest

[22] Filed: Sept. 14, 1973

[21] Appl. No.: 397,427

[30] Foreign Application Priority Data

| Sept. 20, 1972 | United Kingdom | 43450/72 |
| Dec. 8, 1972 | United Kingdom | 56708/72 |
| Jan. 15, 1973 | United Kingdom | 02067/73 |
| July 13, 1973 | United Kingdom | 33453/73 |

[52] U.S. Cl. ............................. 340/58; 73/146.5
[51] Int. Cl.² ............... G08B 21/00; B60C 23/04
[58] Field of Search ........... 340/58, 52 A; 73/146.5; 200/61.25

[56] References Cited

UNITED STATES PATENTS

| 1,908,503 | 5/1933 | Behrend et al. | 73/146.5 |
| 2,071,256 | 2/1937 | Dobbs | 73/146.5 |
| 2,270,148 | 1/1942 | Stowe | 73/146.5 |
| 2,475,533 | 7/1949 | Varner | 340/58 |
| 2,550,041 | 4/1951 | Cozzolino et al. | 340/58 |
| 2,554,419 | 5/1951 | Greene | 340/58 |
| 2,728,230 | 12/1955 | Haramic | 340/58 |
| 2,814,684 | 11/1957 | Pascale | 340/52 A |

Primary Examiner—Glen R. Swann, III
Attorney, Agent, or Firm—Steinberg & Blake

[57] ABSTRACT

A transducer which communicates with the interior of the tire converts the pressure therein, when the pressure changes, into a corresponding motion which is picked up by a transmission and transmitted to a rolling electrical contact which rolls along a series of discrete electrically conductive members having resistances of different magnitudes associated therewith and corresponding to the tire pressure when a given electrically conductive member is engaged by the rolling contact member. Preferably the rolling contact member engages an electrically nonconductive insulating portion situated between the electrically conductive members in a region of normal tire pressure. The engagement of the rolling contact member with one of the electrically conductive members serves at least partly to complete a circuit which includes an indicator visible to the operator for indicating on a suitable scale the tire pressure.

10 Claims, 17 Drawing Figures

APPARATUS FOR INDICATING PNEUMATIC TIRE PRESSURE

BACKGROUND OF THE INVENTION

The present invention relates to vehicle tire pressure indicating apparatus for continuously indicating increased or reduced tire pressure during movement of the vehicle.

Hitherto, devices have been proposed which indicate a decrease in tire pressure beyond a certain fixed predetermined lower limit and simply act as an alarm and do not give an indication of the actual tire pressure as it deviates from normal.

SUMMARY OF THE INVENTION

It is accordingly a primary object of the present invention to provide an improved pressure indicating apparatus which will avoid the drawbacks of previously known apparatus of this type.

In particular, it is an object of the present invention to provide an apparatus of this type which will have a long operating life due to the fact that moving parts thereof are subjected only to a minimum amount of wear.

In addition it is an object of the present invention to provide a device of this type which is capable of conserving power to such an extent that power is consumed only when an abnormal tire pressure is indicated.

Furthermore, it is an object of the present invention to provide a device of this type capable of having one indicator for indicating the pressure at all of the tires of a vehicle without requiring the operator first to guess at which tire has the abnormal pressure to be indicated at the one indicator.

A still further object of the present invention is to provide an apparatus of this type which is extremely accurate so that the possibility of false indications of improper pressure is avoided.

According to the present invention there is provided vehicle tire pressure indicating apparatus which includes converting means for converting variations in pneumatic pressure into mechanical displacements and conduit means connectable so as to communicate with the interior of a tire, lever means forming part of a transmission means and displaceable by said converting means and carrying first electrical contact means displaceable along a plurality of discrete, second electrical contact means each of said second contact means having a different resistance associated therewith, an electric power source connectable to said first and second contact means to form a circuit, insulated electrical connecting means for providing an electrical connection in the circuit between relative stationary and moving parts, and an indicating device locatable in the circuit and responsive to current flow. The indicating device is calibrated to indicate variations in tire pressure proportional to the magnitude of the current permitted to flow in the circuit by the relative positioning of said first and second contact means.

The said converting means is preferably a pressure gauge component and the lever means is connected to the member of the gauge which is movable in response to pressure variations. The lever means preferably includes at least one pivotally mounted spring bias means, e.g. a leaf spring, carrying said first electrical contact means which in turn preferably comprises at least one metal rolling contact means rotatably mounted on the spring bias means for rolling engagement with the second electrical contact means. The plurality of second electrical contact means and associated resistances may in fact be replaced by a variable resistance and a no-contact region will be provided along the resistance at a location corresponding to normal tire pressure so that when the slider, forming the first contact means, rests on said no contact region no current flows.

However it has been found preferable to utilize a plurality of spaced apart metallic surfaces separated by insulating material as said second contact means and to utilize different resistances which are preferably of high stability.

The mentioned first electrical contact means will preferably comprise at least one metal rolling means rotatably mounted on said spring bias means for rolling engagement with said second contact means. In a preferred embodiment the rolling means comprises at least one wheel displaceable between a plurality of pairs of spaced apart metallic surfaces forming the second electrical contact means with the metallic surfaces of each pair being electrically interconnected and with the pairs of surfaces being electrically insulated from one another, whereby contact of said wheel with the second contact means is ensured for optimum periods despite vibrational influences.

The pressure indicating apparatus is operable when mounted on a vehicle wherein the mentioned electrical connection means comprises a continuously electrically conductive surface on a rotary wheel support member of the vehicle, and rolling electrical contact means mounted on a non-rotating portion of the vehicle and urged into contact with said continuous conductive surface; wherein said converting means, lever means, and said first and second electrical contact means are mounted on said rotary wheel support member (hub); and wherein said electric power source and said indicating device are mounted on non-rotary parts of the vehicle.

In a preferred combination with a vehicle said electrical connection means comprises a continuously electrically conductive cylindrical surface mounted on an electrically insulating layer on a rotary wheel support, and rolling electrical contact means are mounted on and insulated from the main body of the vehicle and spring biassed into contact with said cylindrical surface; and wherein said converting means, lever means, and said first and second electrical contact means are mounted on a wheel hub; wherein said electrical power source and said indicating device are mounted on non-rotary parts of the vehicle; and wherein one electric pole of the power source is connected to the rolling electrical contact means and the cylindrical surface is electrically connected to the resistance of the second contacts and the other electric pole is connected to the body of the vehicle and is electrically connected to the rolling means.

Preferably an alarm means and associated second electrical power source is incorporated in said circuit and is energised by displacement of said first contact means out of a rest space provided between the second contact means and indicative of a normal tire pressure, a switch being provided to de-energise said alarm means and energise said circuit incorporating the indicating device to ascertain a tire pressure reading. Advantageously a plurality of converting means, lever means and first and second contacts are provided each for mounting on a separate wheel hub and are incorporated in a circuit including a single indicating device and switching means for enabling each set of first and second contact means to separately complete the circuit with the indicating device.

It is to be understood that the present invention enables a continuous tire pressure indication to be obtained when incorporated in a vehicle and furthermore, by appropriate arrangement of suitable resistances, both increases and decreases in tire pressure are indicated.

BRIEF DESCRIPTION OF DRAWINGS

The invention will be described further, by way of example, with reference to the accompanying drawings, in which:

FIGS. 12, 13 and 14 are sectional views of the different embodiments of different biassing means for rolling contact members;

DESCRIPTION OF PREFERRED EMBODIMENTS

Figure 1:
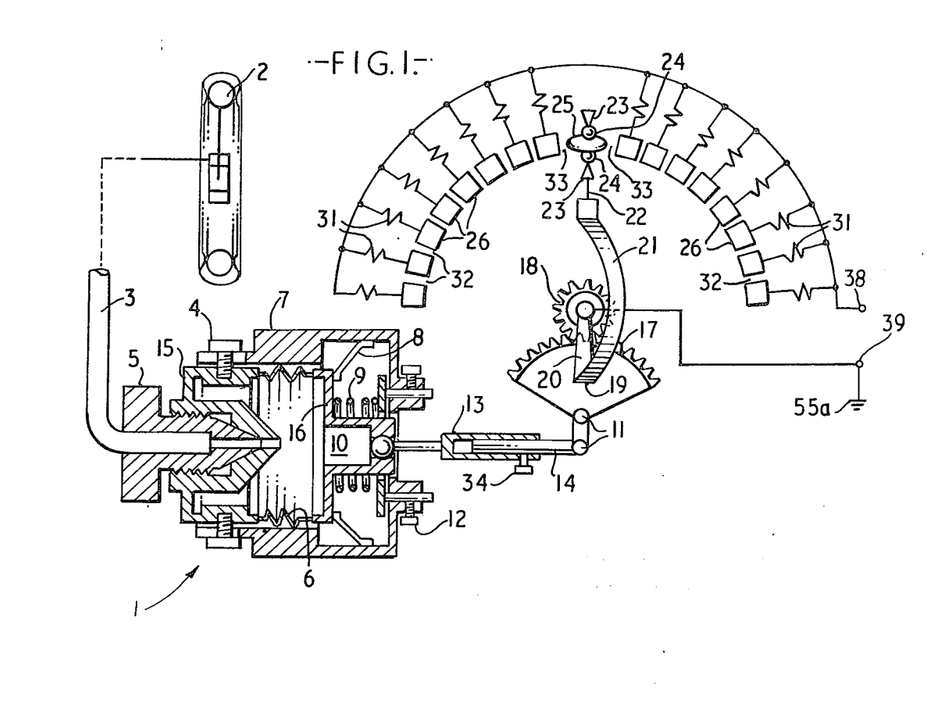
FIG. 1 is a sectional schematic illustration of a portion of the indicating apparatus which is to be mounted on the hub (or wheel) of a vehicle for rotation therewith.

The apparatus illustrated in FIG. 1 is the portion of one embodiment of the invention which is to be mounted on a wheel or hub to rotate therewith and comprises means for converting variations in pneumatic pressure into mechanical displacements in the form of a gauge component 1 which includes a cylinder 10 connected with the interior of a tire (indicated at 2) via a conduit 3 and via a hole in a wheel or tire valve as desired. A conduit receiving part 15 while rotating with the wheel is stationary with respect to the cylinder axis and a part 16 movable along the cylinder axis is also provided; parts 15 and 16 being connected together by expanding sleeve 6. A spring 9 holds the part 16 in a constant position when the pressure of the associated tire stays constant. A housing 7 is adjustably connected to part 15 by screws 4. The gauge component may be calibrated or adjusted by the screws 4, 12 and 34 so it is possible to hold or adjust the position of leaf spring 21 so as to be in the middle position of insulated surface 33 at normal tire pressure.

Lever means are provided to be displaceable by the gauge component and comprise an arm member having a sleeve 13 at one end and a ball at the other end jointed into a socket in the part 16. A second arm 14 is displaceably mounted in sleeve 13 and adjustably locatable therein by screw 34; arm 14 in turn being connected via pivot axis 11 and a transmission means formed by a toothed segment and pinion 18 to a needle portion 20 turnable with pinion 18 and having a light leaf spring 21 at its end 19.

A small, light wheel 25 forming a first electrical contact means rotates around the axle 22 on the end of the leaf spring 21 and rolls over the plane of metallic surfaces 26 forming second electrical contact means in between which are provided insulated surfaces 32 and 33. Wheel 25 is preferably very light, of sufficient diameter to rotate easily along the surfaces, and the circumference of the wheel which is in contact with the said surfaces is preferably very sharp to provide good conductivity and electrical connection. The axes 22 should be of very small diameter so as to minimise any frictional forces. The metallic surfaces 26, the wheel 25 and the axle 22 are preferably formed of metal having the following characteristics: (a) small resistance (b) small coefficient of friction and (c) good electrical conductivity, e.g. silver or brass or the like.

Figures 3, 4, 5, 6, 7, 8, 9:
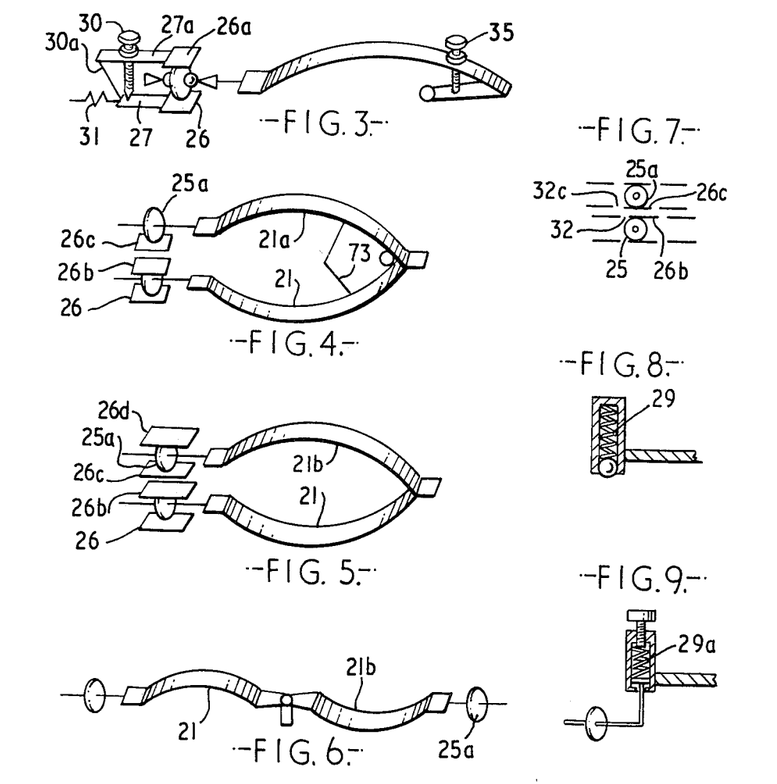
FIG. 3 is a part sectional illustration of a spring bias means provided by a leaf spring needle and a first contact means provided by a small wheel which rotates between the two systems of metallic and insulated surfaces.
FIG. 4 is a part sectional illustration of two leaf spring needles and two small wheels rotatable on three systems of metallic and insulated surfaces.
FIGS. 5 and 6 show a sectional view of two leaf spring needles and two small wheels rotatable on four systems of metallic and insulated surfaces.
FIG. 7 is a part cross sectional view of FIG. 5 showing the proper position of four systems of metallic and insulated surfaces and two rotatable wheels on them for continuous rolling contact on metallic surfaces.
FIG. 8 is a sectional illustration of the end of a pivoted lever means (needle) wherein a helical spring is used instead of a leaf spring and spring biasses a ball bearing forming first contact means.
FIG. 9 is a sectional view of the end of a pivoted lever means similar to that of FIG. 8 but wherein the rotatable ball is replaced by a spring biased small wheel.

A small screw similar to that (35) of FIG. 3 is preferably provided to regulate the pressure of the leaf spring 21 so as to enable the wheel 25 to press lightly against the metallic surface 26 and make good contact therewith without creation of excessive friction acting to prevent rotation of the wheel. To reduce friction, two smaller diameter rotatable members 24 are inserted on either side of the wheel and are helded in place by two other rings 23. One of these rings is fixed at the end of the axle 22. A toothed wheel may be used instead of smooth surfaced wheel 25. The insulated surfaces 32 must be extremely narrow and the metallic surfaces large enough to avoid picking up vibrations from the tire.

To avoid problems resulting from vertical vibrations and to ensure continuous engagement of wheel contact 25 with the metallic surfaces 26, a second system of metallic surfaces 26a is proposed and illustrated in FIG. 3; surfaces 26a being exactly symmetrical to the metallic surfaces 26, and placed in symmetrical position above the rotating wheel 25. Accordingly, the wheel 25 rolls between surfaces 26 and 26a and two points on the wheel diametrically exactly opposite will contact on these metallic surfaces. This second system of metallic surfaces may not be rigidly fixed, and accordingly a leaf spring 27a is fitted to give sufficient support to the metallic surfaces 26a and the wheel will make adequate contact on the surfaces 26a, 26. The surfaces 26a, must press against the wheel very lightly. The symmetrical surfaces 26a may also be rigidly supported. In this case the distance between the wheel 25 and the surfaces 26a must be infinitely small. Every two opposite segments of the symmetrical surfaces must be connected to the same ohmic value resistance 31, (FIGS. 1, 3), as shown by 30a, FIG. 3, so that when the wheel 25 loses contact from the lower metallic surface it will instantaneously contact the upper symmetrical metallic surface 26a. The strength of the leaf springs 27a and 21 may be regulated by screws 30 and 35, respectively.

When the wheel 25 passes onto an insulated surface 32 the needle 69 of an indicating device (galvanometer FIG. 16) moves to zero or "normal". To avoid this deficiency, a further wheel 25a may be used, see FIGS. 4, 5 and 6. The metallic surfaces 26b, 26c should be positioned in offset manner as shown in FIG. 7 so that when the wheel 25 passes onto insulated surface 32, the wheel 25a remains in contact with the metallic surface 26c and when the wheel 25 contacts the next metallic surface, the wheel 25a instantaneously moves onto insulated surface 32c.

As is apparent from FIGS. 4 and 5, the leaf spring which forms the spring biasing means may include a pair of limbs as illustrated, the limbs 21 and 21a of FIG. 4 being interconnected by an element 73 while the limbs 21 and 21b of FIG. 5 are only connected at their right end, as viewed in FIG. 5.

It will be noted from FIG. 6 that it is possible to situate the curved limbs 21 and 21b so that they are diametrically opposed to each other with suitable sets of electrically conductive members 26 being provided for this arrangement.

With respect to FIGS. 8 and 9, these FIGS. illustrate other possible spring-biased rolling contact means, FIG. 8 showing a ball which is pressed by the spring 29 while FIG. 9 shows a roller similar to the roller 25 or 25a but carried by an L-shaped arm which at one end is connected to a piston acted on by the spring 29a. Thus these variations are also possible for the pivoted spring-biased rolling contact means.

Figure 2:
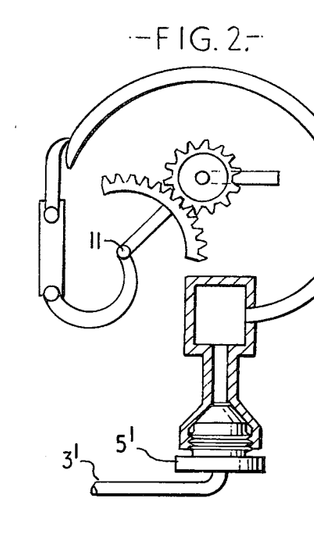
FIG. 2 is a part sectional illustration of an alternative embodiment using a Bourdon Pressure gauge as converting means instead of the pressure gauge component of FIG. 1.
Figure 17:
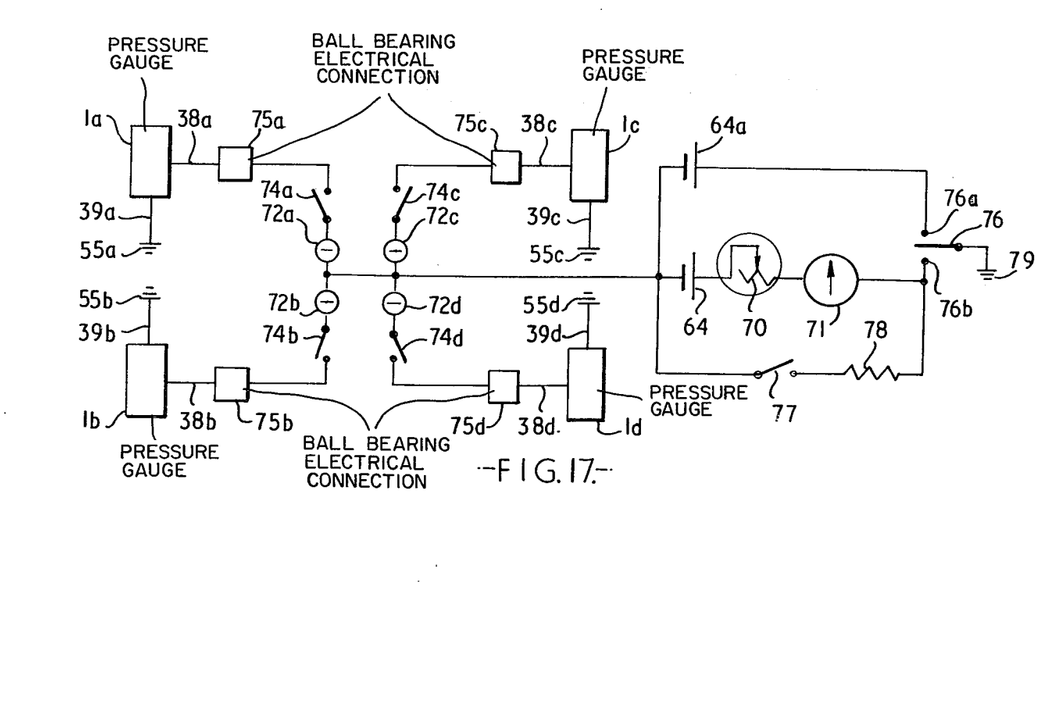
FIG. 17 shows a complete electrical circuit arrangement for an automotive vehicle having four tires.

When the air pressure becomes lower or higher the needle 20 moves and the wheel 25 contacts with the metallic surfaces 26 (FIG. 1) which are connected electrically through resistances 31 to the battery 64 and calibrated galvanometer (micro-ammeter) 71 (FIG. 17). This connection is effected via a moving electrical coupling such as the ball bearing systems of FIGS. 10 and 11 which have an insulated "pick-up" component 58/58a. Instead of gauge component 1 it is possible to use another type of converting means such as a Bourdon gauge as shown in FIG. 2, the lever system of which will be connected to first and second contact means (not shown) and will be displaceable by an arcuate flexible tube portion. FIG. 2 shows how the illustrated gauge can be connected to the interior of the tire through components 3' and 5' which respectively correspond to components 3 and 5 of FIG. 1. Alternatively, an electrical resistance gauge with manganin wire or any proper type of pressure gauge may be used.

Instead of spring 9, it is possible to use leaf spring 8 or a combination of the two.

Location of Pressure Gauge Component

Vehicle wheels are subject to vertical vibrations and accordingly to minimize the effect of such, the pressure gauge component should be positioned on a suitable place on the outside part of wheel hub, as follows:

1. The plane which is described by the needle (lever arm supporting first contact means) when the tire rotates is parallel to the plane of the tire (or perpendicular to the ground).
2. The plane of insulating surface 32 is perpendicular to the wheel.
3. The small wheel 25 should lie either at the axis of the wheel or on a radius of the vehicle's wheel.
4. The wheel 25 should be nearer to the axis of the vehicle wheel than the metallic and insulated surfaces 26, 32 so that the small wheel 25 can retain contact with the surfaces 26, 32 even when subject to the action of centrifugal forces.

Figure 10:
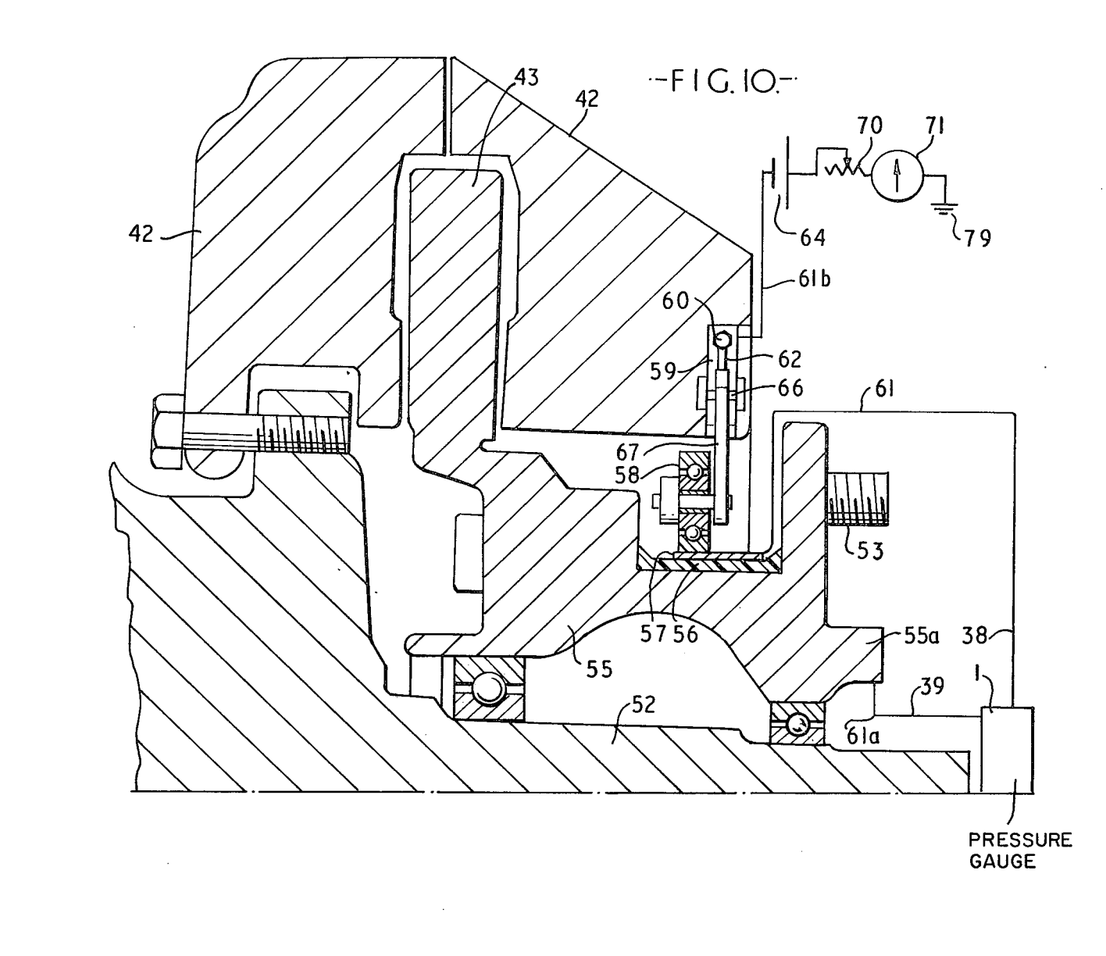
FIG. 10 is a cross sectional view of a vehicle wheel assembly and one (or two) ball bearings connected to a stationary part of the vehicle.
Figure 11:
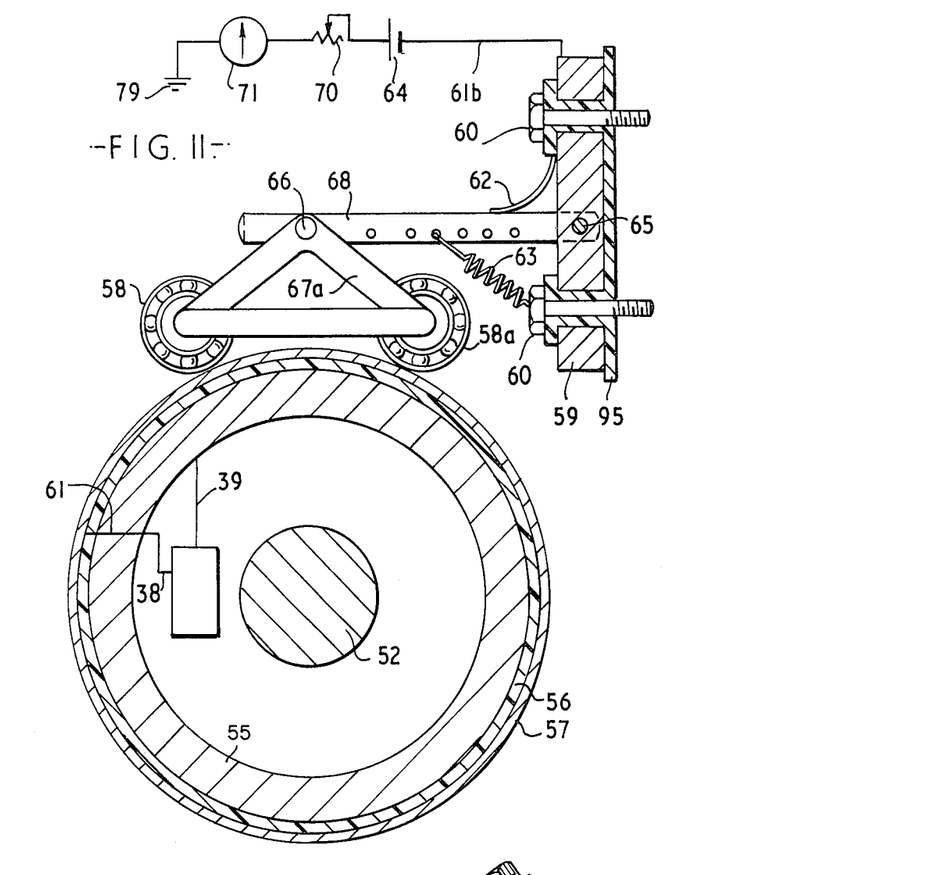
FIG. 11 is a part cross section of a wheel hub taken perpendicular to the stub axle of the FIG. 10 with a rolling means and with a circuit similar to that of FIG. 10.

FIGS. 10 and 11 show an electrical contact between a rotating part and a non-rotating part of a car hub and wheel. Two ball bearings 58 and 58a are mounted at one end of metal plate 67a. The other ends of these two plates are connected to an end region of a further plate 68 by a screw 66 and the other end of the further plate 68 is connected by pivot axle 65 to a metal body 59 forming the ball bearing holder. This holder is secured by two or three screws 60 on a part of a brake caliper 42 (FIG. 10) or on another non-rotating part of the wheel support.

The holder 59 must be insulated from the metal body of the car by a layer 95 of insulating material. A leaf spring 62 and/or a helical spring 63 holds the ball bearings 58, 58a in constant contact with a metallic surface 57 mounted to extend around the complete circular part of wheel hub 55 surrounding wheel axle 52. This surface 57 is insulated from the wheel hub 55 by an insulated layer 56 (FIG. 10, 11) and it is connected by a cable 61 with the one terminal 38 (FIGS. 1 10 and 11) of pressure gauge 1 (transducer). The other terminal 39 of this gauge is connected by cable 61a to the wheel hub portion 55a (FIG. 10). A plurality of holes are mounted on the plate 68 for adjusting the tension of the spring 63. The metal body 59 is connected by another cable 61b with one terminal of the battery 64 (FIGS. 10, 11). The other terminal of this battery is connected with the variable resistance 70 and with one terminal of the pressure indicating means 71 as shown (FIG. 10, 11). The other terminal of the means 71 is connected to the chassis of the car forming the ground 79.

Figure 13:
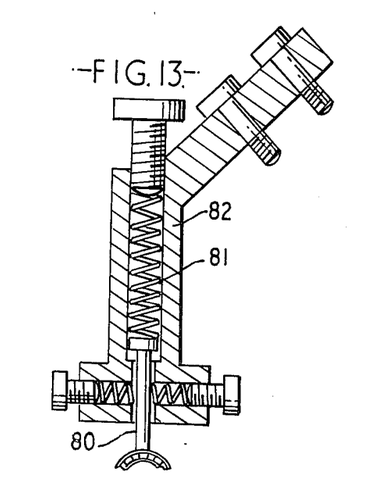
Figure 14:
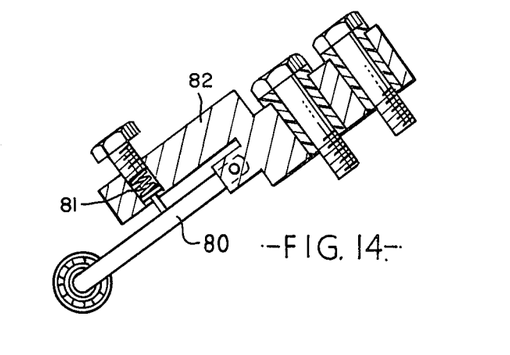

It is possible to modify the construction of the above ball bearing holder and to use other moving contact arrangements such as shown in FIGS. 12, 13, 14 with one or more ball bearings mounted on the ends of displaceable carriers 80 spring biased by spring 81 located in arm 82.

The type, size and properties of metallic surfaces 57, 58 must be properly chosen to provide sufficient contact and should be produced from stainless steel to minimize oxidation.

Figure 15:
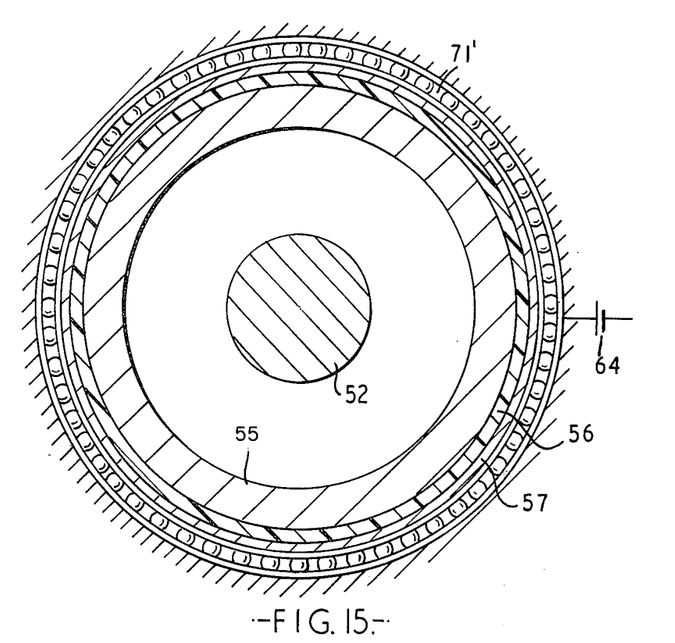
FIG. 15 is a sectional view of an encircling ball bearing race and bearings extending around the wheel hub and is an arrangement which can be used instead of the ball bearing wheels of FIG. 11.

It is possible to substitute the system of ball bearings used in FIGS. 11, 12, 13 and 14 with a larger ball bearing 71' which is mounted around the wheel hub 55 and is insulated from the hub of the wheel by an insulated layer 56 (FIG. 15). The outer part of this ball bearing should be rigid and connected with one terminal of battery 64.

Figure 16:
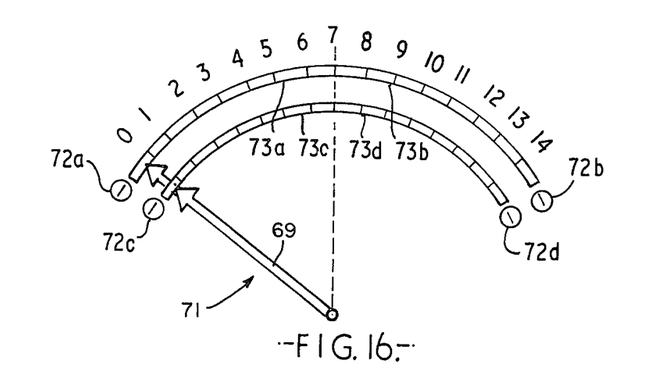
FIG. 16 shows the front part of a galvanometer (micro-ammeter or micro-voltmeter) provided as indicating device to measure the current which passes through the various resistances of FIG. 1.

FIG. 16 shows the front part of a galvanometer (micro-ammeter or micro-voltmeter) which forms an indicating device. The resistances 31 and the galvanometer are calibrated and accordingly the needle 69 of this galvanometer 71 indicates the pressure of the tyres at any time. This galvanometer is connected in series with a variable resistance 70 in order to adjust the initial reading when the battery 64 drops.

Instead of the mechanical pressure gauges as illustrated in FIGS. 1, 2 a pressure variation transducer can be used with variable capacitance. Also instead of using a micro-ammeter, FIG. 16, a capacitance meter may be used.

Operation of Apparatus

Two groups of resistances 31 are provided and with increase in pressure the wheel 25 (FIG. 1) moves to the group of metallic surfaces 26 which are connected with the right group of resistances 31, as viewed in FIG. 1. The first resistance of this group has a value which passes a current to turn the needle 69 (FIG. 16) to, for example, indicate value 8 on the scale 73*b* (FIG. 16). When the wheel 25 comes in contact with the second pair of symmetrical metallic surfaces, the second resistance, of specific value, passes a current to turn the needle 69 to indicate the point 9 and so on. When the pressure decreases, the small wheel 25 moves to the group of metallic surfaces 26 which are connected with the left group of resistances 31, as viewed in FIG. 1. When the wheel 25 comes in contact with the first pair of these left metallic surfaces 26, the first resistance, of specific value, passes a current to turn the needle 69 to indicate value 6. The second resistance corresponds to the point 5 and so on. The numbers 1, 2 . . . 14 can be substituted by other numbers indicating the real pressure. The number 7 corresponds to the normal pressure. The upper scale 73*a*, 73*b* corresponds to the front tire and the lower scale 73*c* 73*d* corresponds to the rear tire. Also there are four alarm lamps. Lamps 72*a*, 72*b* correspond to the front left and right tire respectively and the lamps 72*c*, 72*d* correspond to the back left and right tire respectively. These lamps form an alarm means visible conveniently to the operator together with the galvanometer at a suitable non-rotating part of the vehicle. For a galvanometer to be used, a battery with constant current and voltage is required and an apparatus is required so to stabilize them, e.g. a variable resistance 70 etc.

FIG. 17 shows an electrical circuit which comprises four pressure gauges 1*a*, 1*b*, 1*c*, 1*d* for the four tire, four alarm lamps 72a, 72b, 72c, 72d, connected into the circuit through normally closed switches 74*a*–74*d*, respectively, two batteries 64, 64*a* a micro-ammeter 71 with two scales, a variable resistance 70 and a resistance 78 which has the same value as the one of the pressure gauge resistances. Components 75*a*, 75*b*, 75*c*, 75*d* are the whole system of ball bearing and electrical connections between the moving part of each wheel and the vehicle body. The battery 64 gives current in micro-amps which is not capable of energising even the most sensitive alarm lamp and so an auxiliary and more powerful battery 64*a* is connected to the circuit as shown in FIG. 17. The starting position of switch 76 is to connect the battery 64*a* through 76*a*. Thus, the galvanometer 71 is bypassed, and instead the more powerful source 64*a* is electrically connected through the several lamps and the several means 75*a*–75*d* to the several units 1*a*–1*d*, respectively, which are illustrated in FIG. 1. As a result during normal tire pressures when the rolling contact means 25 engages the central insulating surface 33, the circuit through the several lamps will remain open, and no current will be consumed, so that an exceedingly economical operation is achieved in this way. When a lamp corresponding to a tire turns on in response to engagement of element 25 of one of the units 1*a*–1*d* with an element 26 therein, and it is desired to know the value of the abnormal pressure of the tire corresponding to the alarm lamp which has become illuminated, the switch 76 is turned to 76*b* in order to connect it to the battery 64 and thus disconnecting the battery 64*a* and placing the micro-ammeter 71 in the circuit so that meter 71 accordingly gives the pressure of the tire. If two alarm lamps 72*a*, 72*b* are lit at the same time and it is desired to know the pressure of the tire corresponding to these lamps, the switch 74*a* is turned off and the switch 76 is placed in the position of 76*b*. The meter 71 will then show the pressure of the tire which corresponds to the lamp 72*b* (front right tire). The same procedure can be followed to know the pressure of the other tire which corresponds to the lamp 72*a* (front left tire). The same procedure can be adopted when three lamps are lit simultaneously. In order to adjust the initial reading of the meter 71 all the switches 74*a*, 74*b*, 74*c*, 74*d* are turned off and the switch 77 switched on, then with the variable resistance 70 the needle of the meter 71 is adjusted to indicate 8 on the scale 73*b* of FIG. 16.

The resistance 78 has a value which is, for example, the same as the resistance which corresponds to the first resistance of the right group of the resistances of pressure gauge 1, FIG. 1. Numeral 79 indicates the ground formed by the chassis of the car and numerals 55*a*, 55*b*, 55*c* and 55*d*, are the hub portions of the four rotating wheels. The numerals 39*a*, 39*b*, 39*c*, 39*d* correspond to one terminal of the pressure gauges and 38*a*, 38*b*, 38*c*, 38*d* to the other terminal. These second terminals are electrically connected through the system of ball bearing and alarm lamp with the rest of the circuit.

It is possible to use only alarm lamps but in this case, to know when the pressure becomes higher or lower, two alarm lamps of different sensitivity must be used for each tyre. In this case the right group of metallic surfaces 26 (FIG. 1) must be connected with the right group of resistances 31 of the same value and the left group with resistances of the lower value. So the less sensitive lamp must remain off when the wheel 25 pass to the right group of metallic surfaces that is when the pressure becomes higher. If the pressure becomes lower, the wheel 25 comes in contact with the left metallic surfaces which are connected with the lower value of resistance and the lamps both turn on.

Four separate circuits of four meters 71 can be used to know the pressure of each tire at any time, thereby avoiding four systems of alarm lamps and their switches. In this case the centre insulated surface 33 (FIG. 1) is replaced by a metallic surface.

The conduit means may communicate with the interior of the tire either via an aperture in the wheel or via the valve of the tire. A suitable plug and socket may be provided when the transducer is located on the wheel.

In its broadest form the invention provides a pressure indicating apparatus for pneumatic tire of vehicles comprising conduit means connectable to communicate with the interior of a tyre, pressure-variation transducer means for producing signals proportional to pressure variations (e.g. variable capacitance or pressure gauge component) and mountable on a rotary support portion for a wheel or tire, insulated electrical connecting means for providing an electrical connection between the transducer when mounted for rotation and a non-rotating portion of the vehicle body, an electric power source connectable to complete an electrical circuit with the transducer, and an indicating device locatable on the vehicle and in the circuit and responsive to variations in the state of the circuit; said indicating device being calibrated to indicate variations in tire pressure.

What I claim is:

1. In an apparatus for indicating pneumatic pressure of a tire carried by a vehicle wheel, converting means adapted to be placed in communication with the interior of the tire for converting variations in pneumatic pressure in the tire into mechanical displacements the magnitude and direction of which correspond to pressure changes, transmission means operatively connected to said converting means to be moved thereby and carrying first electrical contact means for moving the latter along a predetermined path in response to pressure changes, a plurality of discrete electrical contact means distributed along said path and each having a different resistance magnitude associated therewith and respectively corresponding to tire pressures when said first contact means engages the plurality of second contact means, an electric circuit connected to and formed in part by said first and second contact means to at least partly close said circuit when one of said second contact means is engaged by said first contact means, and an indicating device in the circuit and responsive to current flow, said indicating device being calibrated to indicate variations in tire pressure proportional to the magnitude of the current permitted to flow in the circuit by the relative positioning of said first and second contact means, said first contact means including at least one metal rolling means rotatably carried by the remainder of said first contact means and rollable along said path to have rolling contact with said plurality of said second contact means, so that friction between said first and second contact means during tire pressure changes when the vehicle travels is reduced to a minimum, said path forming part of a circle and said transmission means including a spring bias means having at least one pivotally mounted leaf spring connected through said transmission means to said converting means to be turned thereby and carrying said first electrical contact means for rolling the latter along said path and biasing said metal rolling means against said plurality of said second contact means, said rolling means being at least one wheel displaceable between a plurality of pairs of spaced apart metallic surfaces forming the second electrical contact means with the metallic surfaces of each pair being electrically interconnected and with the pairs of surfaces being electrically insulated from one another, whereby contact of said wheel with the second contact means is ensured for optimum periods despite vibrational influences.

2. Apparatus as claimed in claim 1, wherein the spring bias means is a leaf spring having two limbs with each limb carrying one wheel at its end and with at least one of said wheels being displaceable between said pairs of spaced apart electrically interconnected metallic surfaces; said other wheel being displaceable in rolling contact over a plurality of further associated metallic surfaces with each of said further surfaces being electrically interconnected with one of said pairs of metallic surfaces.

3. Apparatus as claimed in claim 2, wherein the metallic surfaces of each said pairs of surfaces are offset relative to each other and to adjacent pairs to provide effective minimum spacing between different surfaces connected to different resistances to thereby ensure substantially continuous current flow in the circuit during displacement of said first contacts.

4. In an apparatus for indicating pneumatic pressure of a tire carried by a vehicle wheel, converting means adapted to be placed in communication with the interior of the tire for converting variations in pneumatic pressure in the tire into mechanical displacements the magnitude and direction of which correspond to pressure changes, transmission means operatively connected to said converting means to be moved thereby and carrying first electrical contact means for moving the latter along a predetermined path in response to pressure changes, a plurality of discrete, second electrical contact means distributed along said path to be engaged by said first electrical contact means during movement of the latter in response to pressure changes, said plurality of second contact means including a pair of intermediate substantially central second contact means spaced from each other by a distance substantially greater than the distance between any other pair of successive contact means, and the spaces between the plurality of second contact means being occupied by an electrically non-conductive insulating material in the same plane as said plurality of second contact means, so that between said pair of substantially central second contact means there is a relatively large non-conductive surface region, the latter being located in engagement with said first electrical contact means in the region of normal tire pressure so that said first electrical contact means remains out of engagement with any of said plurality of second contact means in the region of normal tire pressure, said plurality of said second electrical contact means respectively having different resistance magnitudes associated therewith and respectively corresponding to tire pressures, the vehicle wheel having a rotary part and the vehicle having a non-rotary part, said converting means, transmission means and said first and second electrical contact means being mounted on said rotary wheel part, an electric circuit connected to and formed in part by said first and second contact means to at least partly close said circuit when said first contact means enngages one of said second contact means, an indicating device in the circuit and responsive to current flow, said indicating device being calibrated to indicate variations in tire pressure proportional to the magnitude of the current permitted to flow in the circuit by the relatively positioning of said first and second contact means, and an electric power source, said electric power source and said indicating device being mounted on said non-rotary part of the vehicle.

5. Apparatus as claimed in claim 4, wherein an electrical connection means comprises a continuous electrically conductive cylindrical surface mounted on an electrically insulating layer on said rotary wheel part, and rolling electrical contact means mounted on and insulated from the non-rotary part of the vehicle and spring biased into contact with said cylindrical surface and wherein said converting means, transmission means, and said first and second electrical contact means are mounted on a wheel hub; wherein said electric power source and said indicating device are mounted on non-rotary parts of the vehicle, and one electric pole of the power source being connected to the rolling electrical contact means and the cylindrical surface being electrically connected to the second contact means and the other electric pole of said power source being connected to the body of the vehicle.

6. Apparatus as claimed in claim 4, wherein an alarm means and associated second electrical power source are incorporataed in a portion of said circuit in series with one of said contact means to be energised by displacement of said first contact means out of said insulating region provided between the intermediate pair of said contact means and indicative of a normal tire pressure, said first-mentioned power source and said indicating device being incorporated in a second portion of said circuit also in series with one of said contact means to be energised by engagement of said first contact means with one of said second contact means, and a switch means between said circuit portions for selectively connecting one or the other of said circuit portions into said circuit to de-energise said alarm means, after the latter has been energised, and then energise said circuit portion incorporating the indicating device to ascertain a tire pressure reading.

7. Apparatus as claimed in claim 6, wherein a plurality of gauge components each including said converting means, transmission means and a set of said first and second contacts are respectively mounted on the vehicle wheels and are incorporated in said circuit, the latter includng a single indicating device and said switch means for enabling each set of first and second contacts to separately complete the circuit with the indicating device.

8. Apparatus as claimed in claim 7, wherein said alarm means are electric lamps and are incorporated in said indicating device.

9. Apparatus as claimed in claim 6, in which said indicating device is a galvanometer.

10. Apparatus as claimed in claim 9, wherein a variable resistance and a fixed resistance are in series with said indicating device, said fixed resistance having a magnitude equal to the magnitude of the resistance associate with one of said pair of intermediate second contact means, so that said variable resistance can be manipulated to adjust said indicating device by comparison with said fixed resistance.

* * * * *